US012726403B2

(12) United States Patent
Körner et al.

(10) Patent No.: US 12,726,403 B2
(45) Date of Patent: Sep. 1, 2026

(54) COMPUTER-IMPLEMENTED METHOD AND CORRESPONDING SYSTEM FOR OPTIMIZING RESOURCE CONSUMPTION OF ONE OR MORE OPERATIONS OF TRANSACTION AND/OR IDLE TIME WITHIN A CLOUD COMPUTING SYSTEM

(71) Applicant: Siemens Aktiengesellschaft, Munich (DE)

(72) Inventors: Christian Körner, Bergen (DE); Matthias Saft, Olching (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 21 days.

(21) Appl. No.: 18/419,831

(22) Filed: Jan. 23, 2024

(65) Prior Publication Data

US 2025/0240207 A1 Jul. 24, 2025

(51) Int. Cl.

*G06F 15/177* (2006.01)
*G06F 15/16* (2006.01)
*H04L 41/0816* (2022.01)
*H04L 41/0823* (2022.01)
*H04L 43/067* (2022.01)

(52) U.S. Cl.

CPC ...... *H04L 41/0816* (2013.01); *H04L 41/0823* (2013.01); *H04L 43/067* (2013.01)

(58) Field of Classification Search

CPC ............. H04L 41/0816; H04L 41/0823; H04L 43/067
USPC .................................. 709/202–203, 220–222
See application file for complete search history.

(56) References Cited

U.S. PATENT DOCUMENTS

| | | | | |
|---|---|---|---|---|
| 10,769,685 | B2 * | 9/2020 | Marlowe | H04W 4/024 |
| 12,177,319 | B1 * | 12/2024 | Tijerina | H04L 67/55 |
| 2020/0042442 | A1 * | 2/2020 | Wang | G06F 12/0815 |
| 2021/0019302 | A1 * | 1/2021 | Prakash | G06F 21/602 |
| 2021/0409314 | A1 * | 12/2021 | Murao | H04L 45/02 |
| 2024/0362157 | A1 * | 10/2024 | Kushnir | G06Q 10/103 |
| 2025/0260669 | A1 * | 8/2025 | Talati | H04L 63/0272 |

* cited by examiner

*Primary Examiner* — Bharat Barot
(74) *Attorney, Agent, or Firm* — Schmeiser Olsen PLLC

(57) ABSTRACT

A method, including: analyzing transaction logs of the cloud computing system within a predefined period of time to derive various transaction types with pre-defined behavioral and time attributes of the logged operations of transaction; forming at least one transaction class by clustering the derived transaction types with similar values of the behavioral and/or time attributes into the same transaction class; correlating predefined resource consumption data and/or idle time data with at least one transaction class; verifying that user related technical quality of one or more such operations of transaction is in a predetermined acceptable tolerance range; providing configuration data containing the at least one transaction class with the correlated resource consumption data and/or idle time data for the cloud computing system, if the verified user related technical quality is in the predetermined acceptable tolerance range, otherwise predefined resource consumption data and/or idle time data need to be redefined.

9 Claims, 1 Drawing Sheet

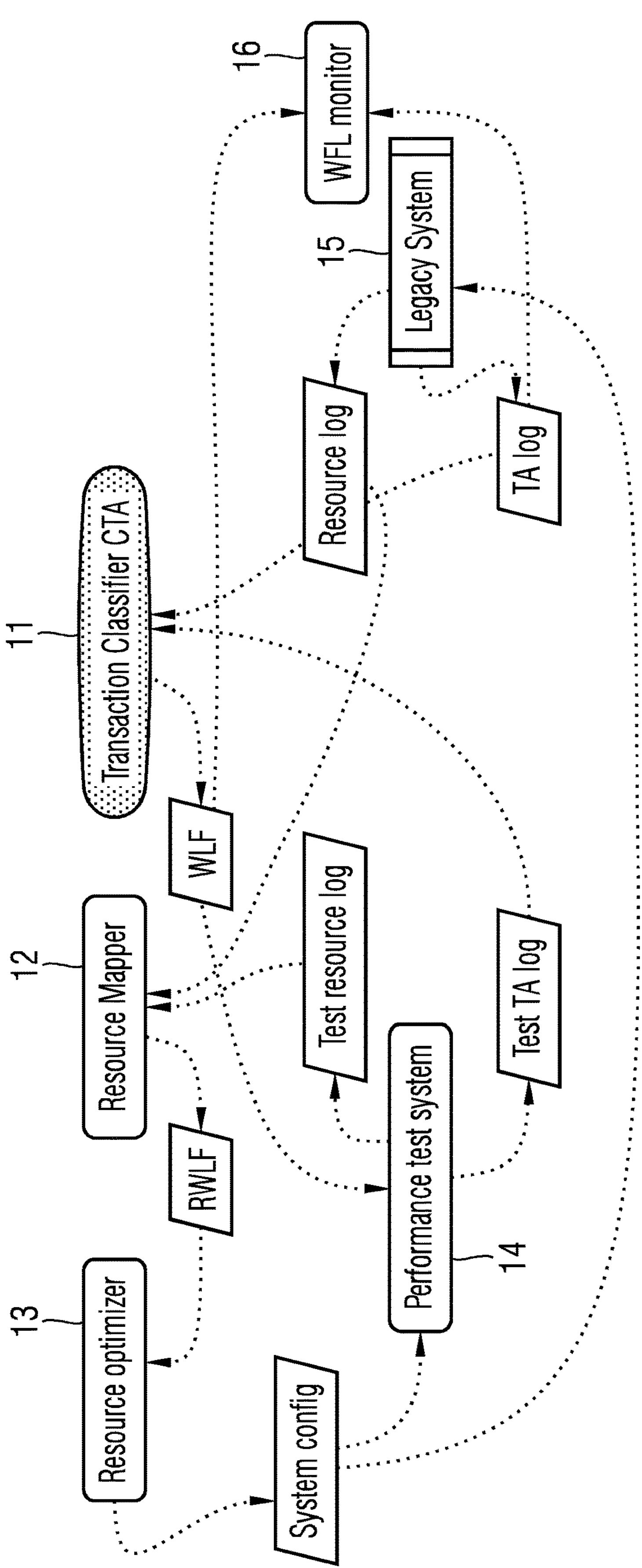
16
WFL monitor
15
Legacy System
Resource log
TA log
11
Transaction Classifier CTA
WLF
12
Resource Mapper
Test resource log
Test TA log
Performance test system
14
RWLF
13
Resource optimizer
System config

COMPUTER-IMPLEMENTED METHOD AND CORRESPONDING SYSTEM FOR OPTIMIZING RESOURCE CONSUMPTION OF ONE OR MORE OPERATIONS OF TRANSACTION AND/OR IDLE TIME WITHIN A CLOUD COMPUTING SYSTEM

FIELD OF TECHNOLOGY

The present invention relates to a computer-implemented method and corresponding system for optimizing resource consumption of one or more operations or transactions and/or idle time within a cloud computing system.

BACKGROUND

In today's cloud world, companies are faced with the challenge of bringing the spread of cloud spending into a more detailed resource and time usage/consumption overview and establishing control mechanisms for technical quality and usability for users. Transparency of cloud costs and accountability for cost quality make trade-offs to optimize spending needs. The key technical quality factors to consider from the user's perspective are reactivity, throughput and stability. Cloud resource usage leads to costs for customers.

So-called FinOps support collaboration between finance, IT and business leadership to promote agile innovation, decentralized decision-making and rapid adaptation to changes. Finops system is to facilitate successful transactions. On a technical level, resource usage/consumption remains relatively constant during low and medium loads. Higher loads require more energy consumption, but this is justified by the additional transactional value generated.

A challenge is to minimize the idle time of computer resources without compromising the technical quality and usability for users or negatively impacting the business. Idle time occurs when no transactions utilizing these resources are in progress, yet the resources remain active within the system and consume energy. Idle time, for instance, is paid by the owner, whereas user just pays for transactions. As an example: More than seven hours of intense system usage causes still 70% idle system expenses without any return for the owner. This is the majority of cost.

Other possible approaches are:

- Total Cost of Ownership (TCO) Analysis: This approach involves analyzing the total cost of owning and operating a system, including the cost savings from implementing FinOps practices. By comparing the TCO before and after implementing FinOps, organizations can quantify the value created by the cost savings.
- Return on Investment (ROI) Analysis: This approach involves calculating the return on investment from implementing FinOps practices. By comparing the cost savings from FinOps to the costs associated with implementing FinOps, organizations can determine whether the investment in FinOps is worthwhile and quantify the value created.
- Business Value Metrics: This approach involves identifying business value metrics, such as revenue growth or customer satisfaction, and correlating them with the cost savings from FinOps. By demonstrating how FinOps practices contribute to business value metrics, organizations can justify the investment in FinOps and quantify the value created.
- Cost Optimization Frameworks: This approach involves implementing a cost optimization framework that balances cost savings with business value. By prioritizing cost optimization measures that have the greatest impact on business value, organizations can maximize the value created by implementing FinOps practices.

All of these approaches lack the above-mentioned users perspective.

In view of this, the objective is to develop an efficient and reliable solution that automatically identifies suitable timeslots for reducing idle time and optimizing resource utilization.

SUMMARY

The above-mentioned objective is achieved by a method and one or more apparatus and/or a system and/or a device according to the features of the independent claims.

Preferred embodiments of the invention are described in the dependent claims. Any combination of the features of the dependent claims to each other and with the features of the independent claims is possible.

An aspect of the invention is a system comprising at least one processor which is configured to optimizing resource consumption of one or more operations of transaction and/or idle time within a cloud computing system including a number of cloud server communicating among each other, comprising:

- an analysis unit for analyzing/scanning transaction logs of the cloud computing system within a predefined period of time in order to derive various transaction types with pre-defined behavioral and time attributes of the logged operations of transaction and
- for forming at least one transaction class by clustering the derived transaction types with similar values of the behavioral and/or time attributes into the same transaction class;
- a mapping unit for correlating predefined (e.g. previously measured and/or assumed/estimated) resource consumption data and/or idle time data with at least one transaction class of the formed transaction classes;
- a test unit for verifying with input of test data that user related technical quality of one or more such operations of transaction is in a predetermined acceptable tolerance range;
- a control/output unit for providing configuration data containing the at least one transaction class with the correlated resource consumption data and/or idle time data for the cloud computing system, if the verified user related technical quality is in the predetermined acceptable tolerance range, otherwise predefined resource consumption data and idle time data need to be redefined.

Redefinition of idle time leads to uptime data for the (re-)configuration for the cloud computing system.

Such configuration data have influence on the cloud server configuration which determines where (on which server according to its computing capabilities) and/or when (on which time) an operation of transaction of which transaction class shall be executed.

A transaction type can be determined by duration (short or long) of the transaction operation, by how often (frequency/reproducable) the transaction operation is executed maybe on repeatable (start) time point/period and/or by resource usage (e.g. CPU/storage usage and/or bandwith/latency of data transmission). If the start time point and/or the duration (examples for a time attribute) and/or frequency (example for a further time attribute) of a transaction type is similar then a transaction class can be formed. Also similar kind of results (example for a behavioral attribute) of the transaction operation can form a transaction class.

Behavioral attributes/characteristics can represent success rate, response time and resource consumption of an operation of transaction of any of the derived transaction classes.

A further transaction class, so-called basis or default class, is formed by each idle time and/or idle time period. Idle time can be derived from the transaction logs. If there is no record/entry between two transaction operations in the log, then an idle time (period) can be identified.

Technical quality consideration for user and herewith cost (resource usage) and value (technical quality) is integrated in the system. Technical quality can be related to response time, frequency or throughput of transactions.

Predefined resource consumption data can be inferred from simulating one or more such operations of transaction with test input data. Such kind of simulation with the gathered data in order to assess technical quality and/or to predict behavior of the operation of transaction can be integrated into the system or outside the system within the multi-user system.

Benefits of the invention are:

Resource and performance optimization with respect of user technical qualities based on transaction classes. It is possible, sizing legacy distributed application in the right manner with optimized operations of transaction after moving them it to the cloud.

Transactions classes can be implemented into microservices. A microservice architecture is usually an architectural pattern that arranges an application as a collection of loosely coupled, fine-grained services, communicating through lightweight protocols. One of its goals is that teams can develop and deploy their services independently of others.

User technical qualities related to transaction (TA) of workflows are determined and adjusted in operations.

Choices are automatically validated on test states without harming production systems.

Monitoring for user technical qualities in relation to system resource usage is possible with relation to an estimated resource for a specific resource usage. Deviations can be directly observed and reacted upon.

A further aspect of the invention is a computer-implemented method for to optimize resource of one or more operations of transaction and/or idle time within a cloud computing system consisting of a number of cloud server communicating among each other, comprising:

- analyzing transaction logs of the cloud computing system within a predefined period of time in order to derive various transaction types with pre-defined behavioral and time attributes of the logged operations of transaction;
- forming at least one transaction class by clustering the derived transaction types with similar values of the behavioral and/or time attributes into the same transaction class;
- correlating predefined resource consumption data and/or idle time data with at least one transaction class of the formed transaction classes;
- verifying with input of test data that user related technical quality of one or more such operations of transaction is in a predetermined acceptable tolerance range;
- providing configuration data containing the at least one transaction class with the correlated resource consumption and/or idle time data for the cloud computing system, if the verified user related technical quality is in the predetermined acceptable tolerance range, otherwise predefined resource consumption data and/or idle time data need to be redefined.

The processor can stear and/or control and/or load and/or execute method steps of the above mentioned method. The processor can be part of a server or of a runtime environment within the multi-user system.

Embodiments as described above for the systems can be analogous applied for the method and for computer program (product) and for the computer-readable storage medium.

Systems can be implemented by hardware, firmware and/or software modules or a combination of them.

The computer-readable storage medium stores instructions executable by one or more processors of a computer, wherein execution of the instructions causes the computer system to perform the method. The one or more processors can be distributed organized on servers or in a cloud.

The computer program (product) is executed by one or more processors of a computer and performs the method.

BRIEF DESCRIPTION

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. In the FIGURES, identical or functionally identical elements are denoted by identical reference signs. Included in the drawings are the following FIGURE:

The FIGURE shows modules of inventive system and its environment.

DETAILED DESCRIPTION

As shown in the FIGURE the system comprises the following components und/or modules respectively:

Cloud Computing System

There is a cloud computing system, in this example a so-called Legacy System 15. A user can set up operations of transactions (TA) on this system. A log comprises a history of actions. A TA log usually includes changes in a database, in this example a not shown database in the legacy system, and a resource log, marked with “resource” log, usually includes the resource uses by a transaction operation over a pre-determined period of time and the response time of each operation of transaction. The log is scanned/analyzed by a not shown analysis unit in order to derive various transaction types from the logged operations of transaction.

The pre-determined period of time can be divided into overlapping timeslices e.g. 10 typical timeslices or days.

Idle time (period) can be identified, if there is no record/entry between two transaction operations in the log.

Transaction Classifier (CTA)

The transaction classifier 11 uses transaction (TA) log marked with “TA log” to create transaction classes with similar/comparable characteristics/attributes. Characteristics/Attributes would be frequency, reaction/response times and success rate. Additional attributes/characteristics can be used for classification like user role, input parameters or (type) identifies.

The transaction classifier should create reproducible types of transaction out of single occurrences from the TA log. These transaction types can be called workflows (WFL), marked with "WFL". Due to this reproducible types the following resource optimization steps and in the monitoring steps can be used.

Identified idle time periods are classified in a default transaction class.

Such a class is important, for instance, in the case: A client server application has been moved to the cloud. Seven hours workdays simply means that all transactions involving user interaction (which is the majority in a client server system) just occurs in seven hours workday.

So, the system is idle more than 70%. In case the system is kept running (as in legacy client server systems) the owner pays up to 70% a day for idle time plus weekends and holydays. Energy consumption is quite useless during such idle time (periods).

So a configuration to the cloud system should comprise a shutdown on a server during such a idle time (period). Then such a server need to be started or awaken on a certain time before executing an operation of transaction of said transaction class. So response time for the first users can be reduced.

Resource Mapper

A mapping unit 12, marked with "resource mapper", correlates resource usage with transaction types mapping TA classes to typical resource usage patterns to obtain for each TA type a resource profile hypothesis. This can be called a resource workflow (RWFL), marked with "RWFL".

Additionally, or alternatively timeslices are built with a constant load and determine the WFLs within. Representative input values to test the performance and resulting user quality can be simulated.

Resource Optimizer

A control unit, in this example called resource optimizer 13, provides configuration data in a package. Configuration data include at least one transaction class with the the correlated resource consumption and/or mapped timeslice and/or idle time (periods) or vice versa uptime data.

The reason for using a pre-configured package for the legacy system. The reason is that the cloud provider usually offers it with a premium rate. Option guides whether it has to be a single system of multiple system may be used for independent workflows. One system is a default setting. In case of multiple systems knowledge of the system with respect to WFL independency is required.

The Transaction classifier and/or the resource mapper also defines technical use qualities which need to be adhered to by the configuration data. In a best case scenario software implementation for a TA would be implemented separately regarding to their resources and the user is separated as well.

Performance Testing System (PT)

A not shown and optionally used simulation unit, preferably coupled or integrated in a performance test system 14 simulates the workflows' resource usage in a performance test system to verify the choices. With TA representative data from CTA it verifies resource usage hypothesis from resource mapper. Additionally, user related technical qualities which are typical for the TA type is tested.

In the case user quality (e.g., response time, TA frequency or throughput, TA success rate) cannot be reached performance of a corresponding measurement setup, the TA type with the mapped time-slice needs to be revised.

A not shown control unit can be configured to initiate the analysis unit and/or the CTA and the resource mapper to restart their processes.

Technical User Qualities Monitor (TQM)

The technical user qualities monitor 16, marked with "WFL monitor", analyses the TA log online to check based on the WFL found by the transaction classifier the user related technical qualities showing the deviation from the averaged found in the classification analysis and eventually agreed upon alarm thresholds. Data privacy is observed by aggregation of potential sensitive information into generalized workflows. In case only single TAs are running which may allow deduction of sensitive information a low load threshold is used to suppress display of online data.

The invention has been described in detail with reference to embodiments thereof and examples. Variations and modifications are possible. Instead of the above-described production process one or more processes can analogously be applied to other technical systems.

The multi user system and its parts can be (computer-) implemented for performing the inventive method steps.

Parts of the system can be integrated into a (computer) cloud system. It includes one or more processors and can be coupled with data, where said processor(s) is/are configured to execute the method steps.

The method can be executed by at least one processor such as a microcontroller or a microprocessor, by an Application Specific Integrated Circuit (ASIC), by any kind of computer, including mobile computing devices such as tablet computers, smartphones or laptops, or by one or more servers in a control room or cloud.

For example, a processor, controller, or integrated circuit of the systems and/or computer and/or another processor may be configured to implement the acts described herein.

The above-described method may be implemented via a computer program (product) including one or more computer-readable storage media having stored thereon instructions executable by one or more processors of a computing system and/or computing engine. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and non-volatile storage media. The functions, acts, or tasks illustrated in the FIGURES or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

In addition, and alternatively, it is possible that a control device receives other computer-readable control signals in order to initiate the mentioned steering/control process by its processor(s).

The invention has been described in detail with reference to embodiments thereof and examples. Variations and modifications may, however, be effected within the spirit and scope of the invention covered by the claims. The phrase "at least one of A, B and C" as an alternative expression may provide that one or more of A, B and C may be used.

The terminology used herein is for the purpose of describing particular embodiments only and is not intended to be limiting of example embodiments of the invention. As used herein, the singular forms "a", "an", and "the" are intended to include the plural form as well, unless the context clearly indicates otherwise.

It is to be understood that the elements and features recited in the appended claims may be combined in different ways to produce new claims that likewise fall within the scope of the present invention. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

None of the elements recited in the claims are intended to be a means-plus-function element unless an element is expressly recited using the phrase "means for" or, in the case of a method claim, using the phrases "operation for" or "step for".

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The claims are as follows:

1. A system comprising at least one processor which is configured to optimizing resource consumption of one or more operations of transaction and/or idle time within a cloud computing system including a number of cloud server communicating among each other, the system comprising:

an analysis unit for analyzing transaction logs of the cloud computing system within a predefined period of time in order to derive various transaction types with pre-defined behavioral and time attributes of the logged operations of transaction and for forming at least one transaction class by clustering the derived transaction types with similar values of the behavioral and/or time attributes into the same transaction class;

a mapping unit for correlating predefined resource consumption data and/or idle time data with at least one transaction class of the formed transaction classes;

a test unit for verifying with input of test data that user related technical quality of one or more such operations of transaction is in a predetermined acceptable tolerance range;

a control unit for providing configuration data containing the at least one transaction class with the correlated resource consumption data and/or idle time data for the cloud computing system, if the verified user related technical quality is in the predetermined acceptable tolerance range, otherwise predefined resource consumption data and/or idle time data need to be redefined.

2. The system according to claim 1, wherein provided configuration data have influence on the cloud server configuration which determines on which server according to its computing capabilities and/or on which time an operation of transaction of which transaction class shall be executed.

3. The system according to claim 1, wherein predefined resource consumption data are inferred from simulating one or more such operations of transaction with test input data.

4. The system according to claim 1, wherein behavioral attributes represent success rate of an operation of transaction of any of the derived transaction classes.

5. The system according to claim 1, wherein the user related technical quality comprises at least one of response time, frequency, or throughput of transactions.

6. The system according to claim 3, wherein the simulating is performed to assess technical quality and/or to predict behavior of the operation of the transaction.

7. A computer-implemented method for optimizing resource consumption of one or more operations of transaction and/or idle time within a cloud computing system including a number of cloud server communicating among each other, comprising:

analyzing transaction logs of the cloud computing system within a predefined period of time in order to derive various transaction types with pre-defined behavioral and time attributes of the logged operations of transaction;

forming at least one transaction class by clustering the derived transaction types with similar values of the behavioral and/or time attributes into the same transaction class;

correlating predefined resource consumption data and idle time data with at least one transaction class of the formed transaction classes;

verifying with input of test data that user related technical quality of one or more such operations of transaction is in a predetermined acceptable tolerance range;

providing configuration data containing the at least one transaction class with the correlated resource consumption data and/or idle time data for the cloud computing system, if the verified user related technical quality is in the predetermined acceptable tolerance range, otherwise predefined resource consumption data and/or idle time data need to be redefined.

8. The method according to claim 7, wherein provided configuration data have influence on the cloud server configuration which determines on which server according to its computing capabilities and/or on which time an operation of transaction of which transaction class shall be executed.

9. A computer program product comprising a non-transitory computer-readable storage medium having stored thereon instructions executable by one or more processors, wherein execution of the instructions causes the one or more processors to perform a method for optimizing resource consumption of one or more operations of transaction and/or idle time within a cloud computing system including a number of cloud servers communicating among each other, the method comprising:

analyzing transaction logs of the cloud computing system within a predefined period of time in order to derive various transaction types with pre-defined behavioral and time attributes of the logged operations of transaction;

forming at least one transaction class by clustering the derived transaction types with similar values of the behavioral and/or time attributes into the same transaction class;

correlating predefined resource consumption data and idle time data with at least one transaction class of the formed transaction classes;

verifying with input of test data that user related technical quality of one or more such operations of transaction is in a predetermined acceptable tolerance range;

providing configuration data containing the at least one transaction class with the correlated resource consumption data and/or idle time data for the cloud computing system, if the verified user related technical quality is in the predetermined acceptable tolerance range, otherwise predefined resource consumption data and/or idle time data need to be redefined.

* * * * *